United States Patent [19]
Petrak

[11] 3,896,908

[45] July 29, 1975

[54] SHOCK ABSORBING APPARATUS

[75] Inventor: Harry A. Petrak, Boulder, Colo.

[73] Assignee: Triple S Industries, Inc., Boulder, Colo.

[22] Filed: May 4, 1973

[21] Appl. No.: 357,452

[52] U.S. Cl. ............... 188/280; 188/319; 188/286; 188/322; 267/127
[51] Int. Cl. .............................................. F16f 9/19
[58] Field of Search ........... 188/280, 289, 317, 319, 188/320, 286, 322; 267/34, 120, 127; 137/493; 92/162

[56] References Cited
UNITED STATES PATENTS

| | | | |
|---|---|---|---|
| 860,913 | 7/1907 | Haekerlein | 188/319 |
| 2,206,110 | 7/1940 | Myers et al. | 188/322 |
| 2,252,771 | 8/1941 | Katcher | 188/280 |
| 2,335,907 | 12/1943 | Boor et al. | 188/319 |
| 2,916,281 | 12/1959 | Hehn | 188/317 |
| 3,528,531 | 9/1970 | Schweller et al. | 188/317 |

FOREIGN PATENTS OR APPLICATIONS

| | | | |
|---|---|---|---|
| 838,403 | 5/1952 | Germany | 188/280 |
| 1,083,043 | 1/1955 | France | 188/317 |

*Primary Examiner*—George E. A. Halvosa
*Assistant Examiner*—Edward Kazenske

[57] ABSTRACT

A fluid-flow control apparatus adapted to absorb shocks includes a cylinder in which a quantity of fluid is retained and a piston assembly axially movable through the cylinder so as to selectively control the flow of fluid through the piston member in dampening forces applied to the piston member. The flow of fluid through the piston member is controlled by a ring member which is resiliently retained within an internal chamber of the piston member to traverse a bypass passage in an internal wall of the piston member whereby the rate of flow of fluid through the piston member is determined by the position of the ring member relative to the bypass passage, the configuration of the passage, and the strength of the resilient member operating on the ring member. There may be a plurality of the bypass passages circumferentially spaced around the inner surface of the piston member each having a distinct configuration and being positionable relative to the slide member so that the flow of fluid past the ring member must flow through a selected one of the passages.

21 Claims, 24 Drawing Figures

PATENTED JUL 29 1975 3,896,908

SHEET 1

Fig_1

Fig_2

Fig_3

Fig_4

Fig_15a  Fig_15b  Fig_15c
Fig_15d  Fig_15e  Fig_f
Fig_15g  Fig_15h  Fig_15i

Fig_16

SHOCK ABSORBING APPARATUS

The present invention generally relates to fluid flow control apparatus and more particularly to a shock absorbing apparatus employing a new and improved system for selectively varying the relationship of pressure applied to a piston to the resultant speed of movement of the piston.

Fluid-flow control apparatus of the type used as shock absorbers or steering stabilizers for automotive vehicles have been characterized by complex cylinder and piston assemblies utilizing vast numbers of parts to effect absorption or dampening of forces applied to the piston assembly. Typically, the shock absorbing apparatus includes a piston member which is axially movable within a fluid-filled cylinder in response to forces applied to the piston rod. Typical piston arrangements include fixed sized orifices or passageways through the piston so that fluid can flow from one side of the piston to the other as the piston is moved axially within the cylinder. In some conventional shock absorbers, in addition to the fixed passageways through the piston, a spring-loaded plate may be used so that when the fluid pressure on the piston exceeds a predetermined value, the plate will move and open a normally closed relief orifice. Since conventional shock absorbing apparatus include fixed sized passages through the piston member, the pressure resistance to piston movement within the cylinder is dependent upon the speed of the piston as it is advanced axially through the cylinder. In other words, since the fluid is allowed to flow through the fixed passageways, there will be relatively little resistance to slow movement of the piston member but as the speed of the piston member is increased, the resistance will increase. In some instances this may be desirable, but in other instances it is desirable that the resistance pressure be increased, decreased, or substantially stabilized with increased piston speed so as to give a pre-selected and variable relationship of piston speed to pressure.

Another characteristic of conventional shock absorbing apparatus is that they require comparatively complex end valving in the cylinder to cooperate with the fixed sized passageways in the piston member to desirably resist movement of the piston member.

It is accordingly an object of the present invention to provide a simplified fluid-flow control apparatus wherein the speed of movement of a piston member through a cylinder is a result of a predetermined pressure resistance.

It is another object of the present invention to provide a new and improved shock absorbing apparatus wherein the pressure resistance to movement of a piston member through a cylinder can be increased, decreased or substantially stabilized with increased piston speed.

It is another object of the present invention to provide a shock absorbing apparatus in which the relationship of pressure on a piston member to the speed of movement of the piston member through a cylinder is at least partially dependent upon the configuration of a bypass passage in the piston member.

It is another object of the present invention to provide a shock absorbing apparatus having a piston assembly with a slide member within the piston adapted to traverse a bypass passage in the piston member to selectively control the flow of fluid through the bypass passage dependent upon the position of the slide member relative to the bypass passage and the configuration of the bypass passage.

It is another object of the present invention to provide a shock absorbing apparatus in which the relationship of piston speed to pressure applied to the piston is dependent to some extent upon the configuration of a bypass passage in the piston member through which fluid can flow from one side of the piston member to the other and wherein there are a plurality of bypass passages in the piston member, each of a different configuration, any one of which can be selected for fluid flow to determine the relationship of piston speed to pressure applied to the piston.

These and other objects of the present invention are achieved with a new and improved simplified fluid flow control apparatus having a piston member axially movable in a closed cylinder in response to pressure applied to the piston rod and wherein a slide member in the piston member is prepositioned by resilient means and adapted to move, in response to fluid pressure, across a bypass passage means in the piston member to selectively control the flow of fluid through the piston member. As will be appreciated with the detailed description hereinafter, the apparatus is primarily responsive to pressure as opposed to changes in piston speed and is designed so that the resistance in the system is to a great extent a result of the pre-established pressure settings or strength of the resilient means acting upon the slide member, the position of the slide member relative to the bypass passage, and the configuration of the bypass passage.

More particularly, a fluid-flow control apparatus such as of the type used as a shock absorber or steering stabilizer on automotive vehicles incorporating the features of the present invention would include a closed fluid-filled cylinder in which a piston member is adapted to axially reciprocate and wherein the piston member has an internal chamber adapted to guide sliding movement of a slide member which is normally retained in position by spring means. The internal chamber of the piston member is in fluid communication with the cylinder at opposite ends thereof whereby movement of the piston member in the cylinder effects compression of the fluid at one end of the cylinder. The compressed fluid, according to conventional fluid flow theory, flows into the internal chamber of the piston member and thereby exerts a pressure against one side of the slide member. The spring means yieldingly resists sliding movement of the slide member allowing the slide member to move under control against the bias of the spring means. Bypass passage means having selectively variable cross-sectional opening sizes and configurations are provided within the inner chamber of the piston member at a location such that the slide member will traverse the bypass passage means, selectively allowing the flow of fluids through the bypass passage means to establish a predetermined pressure resistance curve in the chamber not directly related or responsive to changes in speed. By controlling the fluid flow from one side of the piston member to the other in this manner, it has been found that the speed of movement of the piston member within the cylinder can be controlled to some extent by the cross-sectional configuration of the bypass passage whereby the pressure resistance to the movement of the piston is not directly dependent upon the speed of movement of the piston as in conventional shock absorbing apparatus. On the contrary, it has been found that the pressure resistance can be increased or decreased under increased piston speed by proper design of the cross-sectional configuration of the bypass passage. With this versatility, a pre-established relationship of fluid pressure to piston speed can be obtained for any apparatus and the relationship of pressure to piston speed does not have to be directly proportional. The desirability of such versatility will be readily apparent to those skilled in the art and in addition to the advantages obtained from the versatility of the apparatus, it will be appreciated that the versatility is obtained with far fewer parts than are presently used in conventional shock absorbing apparatus.

In a preferred embodiment of the present invention to be described in detail hereinafter, the piston is designed so that it contains a plurality of bypass passage configurations so that the slide member can be made to cooperate with any selected one of the various configurations thereby providing a plurality of piston speed-to-pressure relationships in a single apparatus. It will also be appreciated that by utilizing a pressure-sensitive slide member in accordance with the present invention, it is not necessary to have a positive seal between the piston member and the cylinder walls since the relationship of the piston speed to pressure would not change with minor fluid leakage between the piston member and cylinder. On the contrary, the same relationship of piston speed to pressure would exist as long as there was enough fluid pressure within the cylinder to move the slide member across the bypass passage within the piston. Along the same lines, it will be appreciated that the apparatus is self-compensating for changes in fluid viscosity due to temperature and for wear or erosion which is not true for conventional shock absorbing apparatus.

Other objects, advantages and capabilities of the present invention will become more apparent as the description proceeds taken in conjunction with the accompanying drawings, in which:

FIGS. 15a through 15i are diagramatic operational views showing the operation of the bypass system utilized in the present invention, and FIG. 16 is a graphic representation of the relationship of pressure applied to the piston of the fluid control apparatus and the resultant piston speed for various bypass passage configurations.

Figure 1:
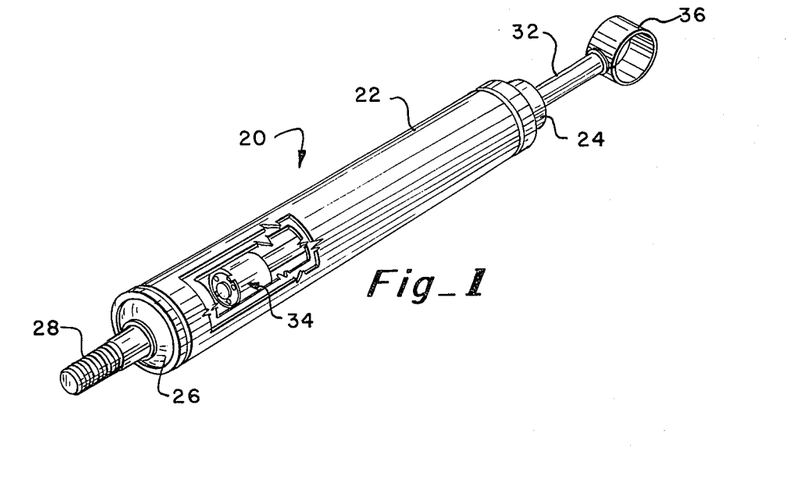
FIG. 1 is a perspective view of a shock absorbing apparatus utilizing the fluid-flow control system of the present invention and having portions broken away for illustrative purposes.

With reference first to FIG. 1, a shock absorbing apparatus 20 incorporating the fluid-flow control system of the present invention is seen to include a cylinder 22 having end caps 24 and 26 at the forward and rearward ends respectively with a threaded stud bolt 28 extending axially away from the end cap 26 at the rearward end of the cylinder. The end cap 24 at the forward end of the cylinder has an axial passage therethrough in which a piston rod 32 is slidably passed in sealed relation with the cylinder. The piston rod 32 carries a piston assembly 34 on its rearward end and a ring clamp 36 on its forward end, the ring clamp being adapted to be attached to a moving component of an automotive vehicle or the like. The stud bolt 28 is adapted to be anchored to the frame or other fixed component of the automotive vehicle or the like so that the shock absorbing apparatus interconnects relatively moving parts to dampen the relative movement.

Figure 2:
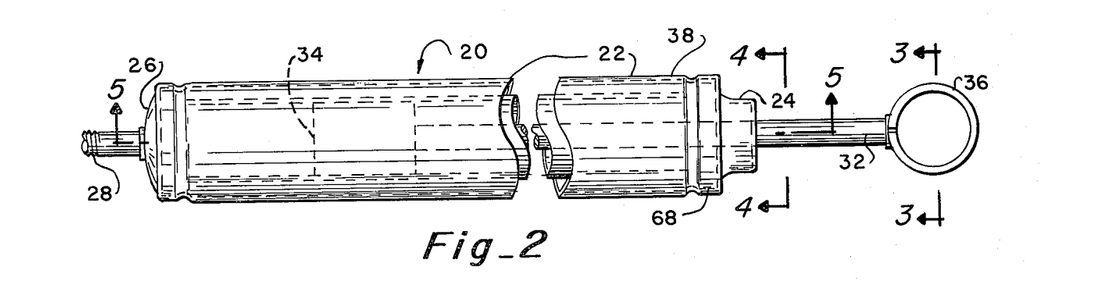
FIG. 2 is a side elevation of the shock absorbing apparatus of FIG. 1 with parts broken away for clarity.
Figures 5, 6, 7, 8:
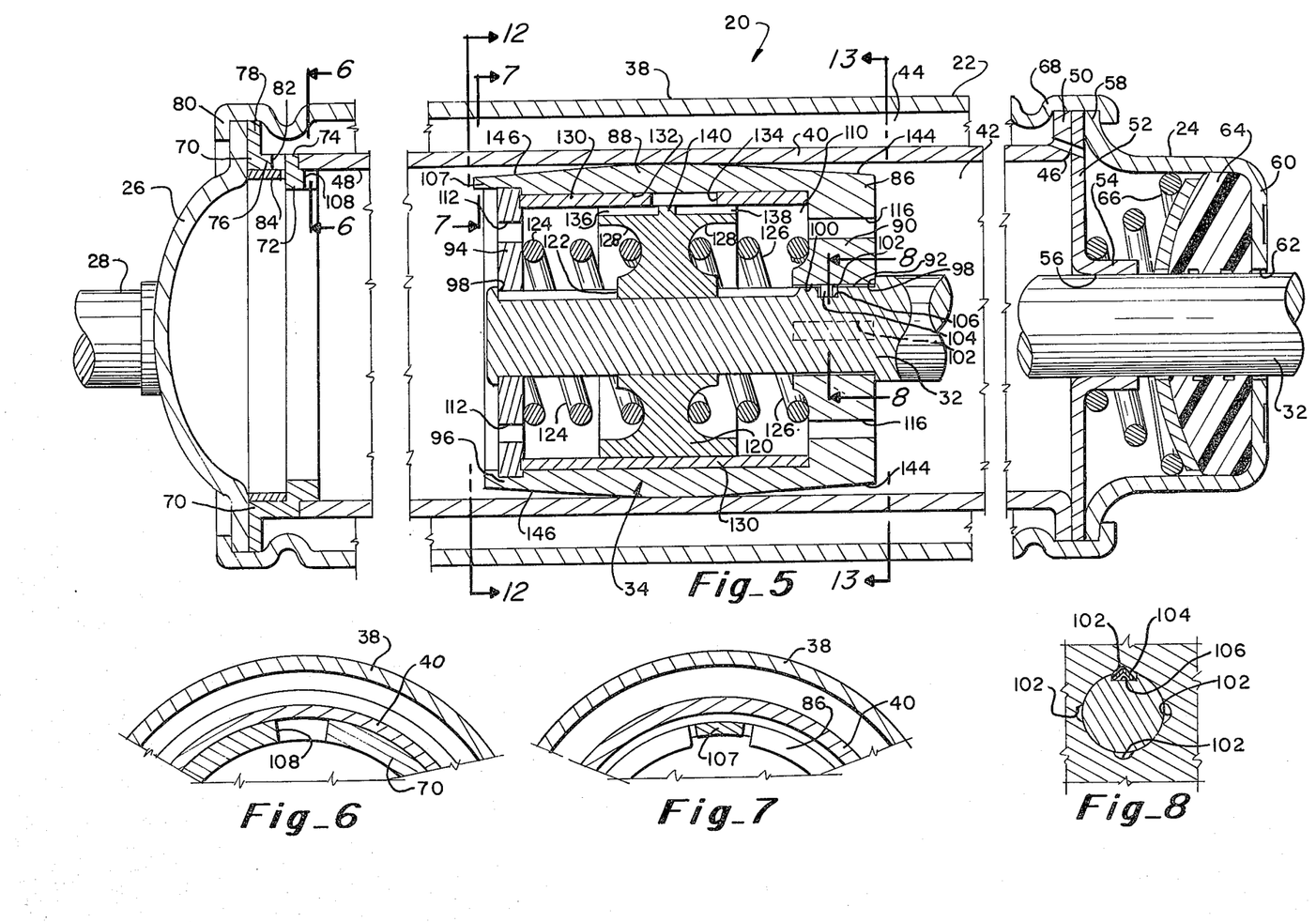
FIG. 5 is an enlarged section taken along line 5-5 of FIG. 2.
FIG. 6 is a section taken along line 6-6 of FIG. 5.
FIG. 7 is a section taken along line 7-7 of FIG. 5.
FIG. 8 is a section taken along line 8-8 of FIG. 5.

As best seen in FIGS. 1, 2 and 5, the cylinder 22 is comprised of an outer cylindrical tube 38 and an inner cylindrical tube 40 defining an inner high pressure compartment 42 and an outer low pressure compartment 44 of the cylinder. With reference to FIG. 5, the inner cylindrical tube 40 can be seen to have open front and rear ends 46 and 48 respectively with an out-turned annular flange 50 around the open front end 46. The out-turned annular flange 50 engages the outer periphery of a circular bearing plate 52 having an inner forwardly directed annular flange 54 circumscribing a central opening 56 in the plate through which the piston rod 32 passes. The forward end cap 24 is generally cup-shaped and has a rear outwardly flared annular flange 58 abutting the opposite side of the circular bearing plate 52 from the annular flange 50 on the forward end of the inner cylindrical tube 40. The forward end 60 of the end cap 24 has a circular opening 62 therethrough also receiving the piston rod 32 so that the piston rod is free to slide axially of the cylinder 22 through the opening 56 in the bearing plate 52 and the opening 62 in the forward end of the forward end cap 24. A conventional seal ring 64 of rubber or the like is held against the forward end 60 of the forward end cap 24 in annular sealing relationship with the piston rod 32 by a compression spring 66 seated on the circular bearing plate 52. The out-turned annular flange 50 at the forward end of the inner cylindrical tube, the bearing plate 52 and the forward end cap 24 are all connected and held in place by annular crimping of the forward end 68 of the outer cylindrical tube 38 around the three component parts.

An end ring 70 is secured to the open rear end 48 of the inner cylindrical tube 40 and has a first axial wall 72 press-fitted into the open rear end 48 of the inner cylindrical tube, a first radial wall 74 abutting the open rear end of the inner cylindrical tube, a second axial wall 76 establishing an axial extension of the inner cylindrical tube and a second radial wall 78. The second radial wall 78 of the end ring 70 abuts the rear end cap 26 and is held against an annular flange 80 on the rear end cap by annular crimping of the outer cylindrical tube 38 around the periphery of the two component parts. The second axial wall 76 of the end ring 70 has an orifice 82 extending radially therethrough establishing fluid communication between the outer low pressure compartment 44 of the cylinder 24 and the inner high pressure compartment 42. A circular split ring 84 of rectangular transverse cross-section is positioned within the cylinder 22 to abut the inner surface of the second axial wall 76 of the end ring 70. The diameter of the split ring 84 is such that it is biased against the inner surface of the second axial wall 76 so as to substantially close the orifice 82 except when a radially inwardly directed pressure is applied through the orifice against the split ring in which case it is caused to flex inwardly to open the orifice and establish fluid communication between the high pressure and low pressure compartments of the cylinder. The width of the split ring is slightly less than the width of the second axial wall 76 so that the orifice is not completely blocked by the split ring as is clearly seen in FIG. 5.

In FIG. 5, the piston assembly 34 can be seen to include a piston body 86 having a generally cylindrical wall 88 substantially conforming to the inner cylindrical wall of the inner cylindrical tube 40 and a forward end wall 90. The forward end wall 90 of the piston body 86 is rotatably seated in an annularly recessed portion 92 of the piston rod 32. A closure plate 94, press-fitted in the rear open end 96 of the piston body, closes the rear end of the piston body and is also rotatably seated in the recessed portion 92 of the piston rod so that the piston body is rotatably disposed on the piston rod and retained in the recessed portion by annular shoulders 98 at opposite ends of the recessed portion. To selectively retain the piston body in one of a plurality of fixed angularly related positions relative to the piston rod, the inner annular surface 100 of the forward end wall 90 of the piston body has notches 102, FIG. 8, at selected circumferential intervals so that a V-shaped spring 104 seated in a notch 106 in the recessed portion 92 of the piston rod will flex into the circumferentially spaced notches 102 to retain the piston body 86 in a selected position. A rotative force applied to the piston body, however, will overcome the spring resistance so that the piston body can be rotated relative to the piston rod until the V-shaped spring 104 snaps into another notch 102 in the piston body. The purpose for the rotative relationship of the piston body relative to the piston rod will become apparent later.

Figure 3:
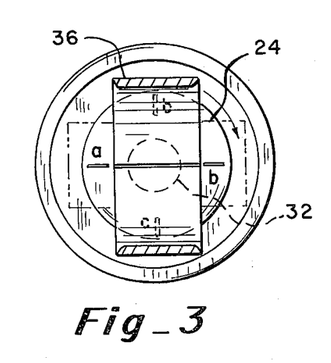
FIG. 3 is an enlarged section taken along line 3-3 of FIG. 2.
Figure 4:
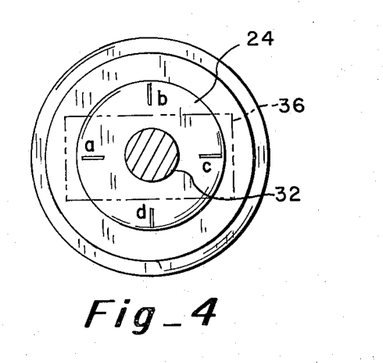
FIG. 4 is an enlarged section taken along line 4-4 of FIG. 2.

In order to apply a rotative force to the piston body 86, a portion of the rearward end 96 of the piston body is provided with a protruding lug 107 and the first axial wall 72 of the end ring 70 has a mating recess 108 whereby the piston body can be moved rearwardly in the cylinder 22 until the lug 107 mates with the recess 108 thereby immobilizing the piston body relative to the cylinder. Thereafter, the piston rod 32 can be rotated relative to the cylinder to cause the piston body 86 to rotate relative to the piston rod. In this manner, the relative angular relationship of the piston body 86 to the piston rod 32 can be changed from outside of the cylinder merely by rotating the piston rod when the lug 107 and recess 108 are in mating relationship so that the spring 104 is moved between notches 102. The available angularly related positions could be visually designated on the exterior surface of the forward end cap with appropriate designations as illustrated in FIGS. 3 and 4 to be a, b, c and d. The number of positions, of course, would be determined by the number of notches 102 in the forward end wall 90 of the piston body adapted to releasably receive the V-shaped spring 104.

In the embodiment shown in FIG. 5, the piston body 86 has a cylindrical internal chamber 110 between the forward end wall 90 of the piston body and the circular plate 94 at the rear end of the piston body. The circular plate 94 has a plurality of circumferentially spaced orifices 112 passing therethrough establishing fluid communication between the internal chamber 110 and the portion of the high pressure compartment 42 rearwardly of the piston body 86. Similarly, the forward end wall 90 of the piston body has axially extending circumferentially spaced orifices 116 to establish fluid communication between the internal chamber 110 and the portion of the high pressure compartment 42 forwardly of the piston body. In this manner, fluid retained within the high pressure compartment 42 of the cylinder member would be allowed to pass through the orifices 112 in the circular plate 94 or the orifices 116 in the forward end wall 90 of the piston body depending upon the direction of axial sliding movement of the piston body within the high pressure compartment.

To control the flow of fluids through the piston body 86 upon axial sliding movement of the piston body, a cylindrical slide or ring member 120 is keyed at 122 to the piston rod 32 for axial sliding movement therealong while being prevented from rotation relative thereto and the ring member is resiliently retained at a preselected position within the inner chamber 110 by a pair of opposing compression springs 124 and 126. The compression springs 124 and 126 abut the ring member 120 in annular grooves 128 provided on opposite sides thereof and respectfully abut the circular plate 94 and forward end wall 90 of the piston body to desirably position the ring member within the chamber. It will be appreciated that the compression springs 124 and 126 will yieldingly resist axial sliding movement of the ring member 120 relative to the piston body in opposite axial directions.

Figures 9, 10, 11:
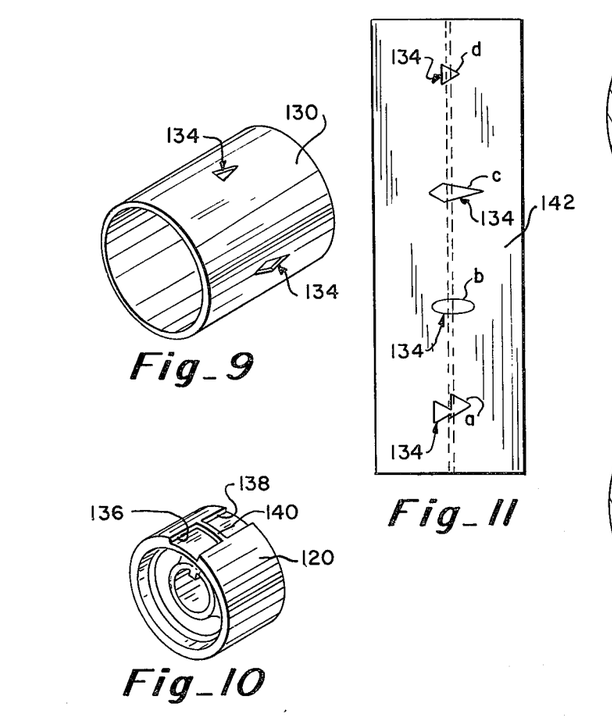
FIG. 9 is a perspective view of the sleeve member utilized in the piston of the fluid-flow control system of the present invention.
FIG. 10 is a perspective view of the ring member used in the piston of the fluid-flow control system of the present invention.
FIG. 11 is a plan view of the planar stock from which the collar of FIG. 8 is formed.
Figure 12:
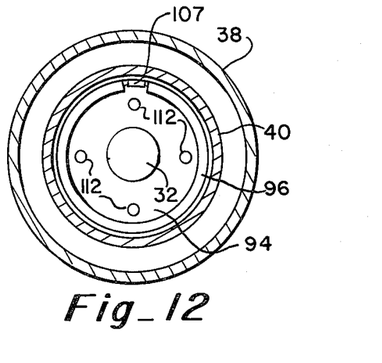
FIG. 12 is a section taken along line 12-12 of FIG. 5.
Figure 13:
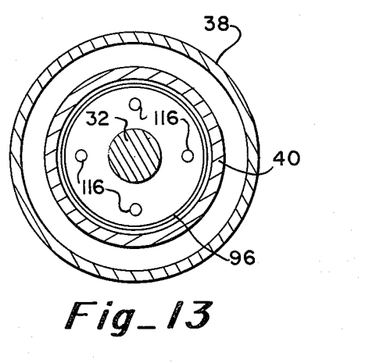
FIG. 13 is a section taken along line 13-13 of FIG. 5.

An inner sleeve 130, which is shown separated from the piston assembly in FIG. 9 and incorporated into the piston assembly in FIG. 5, is retained within the inner chamber 110 of the piston body by the circular plate 94 and annularly engages the inner cylindrical surface 132 of the piston body so as to remain fixed relative to the piston body. The sleeve 130 has a plurality of circumferentially spaced bypass openings 134, each having a different cross-sectional size and configuration for a reason to be described later. The openings 134 are disposed so as to be radially aligned with the ring member 120 and to cooperate with the ring member in controlling the flow of fluid from one side of the piston body to the opposite side. In the preferred embodiment, the ring member 120, as seen in FIG. 10, has a pair of axially aligned grooves 136 and 138 in the outer surface thereof spaced by a circumferentially extending divider 140. The grooves 136 and 138 are adapted to be radially aligned with a selected one of the openings 134 in the sleeve member 130 so that fluid is allowed to pass into one groove, over the divider 140, through the aligned bypass opening 134 in the sleeve, and through the other groove in passing from one side of the ring member 120 to the other. It will be appreciated that while the openings 134 in the sleeve actually pass through the sleeve, they form recesses in the wall of the inner chamber 110 since the inner cylindrical surface 132 of the piston body is flush with the outer surface of the sleeve. As will be more fully explained later, the rate of flow of the fluid past the ring member 120 will be dependent upon the configuration for width and depth of the opening 134 in the sleeve and the position of the divider 140 relative to the opening. In other words, if the divider is aligned with an opening so that there are relatively wide portions of the opening on both sides of the divider, the flow of fluid past the ring member 120 will be optimized and if the divider is aligned with an opening so that a relative narrow portion of the opening exists on one side of the divider, the flow of fluid will be restricted by the reduced opening size thereby limiting the flow of fluid past the slide member. As will be explained more clearly later, the configuration of the opening 134 in the sleeve member 120 has a decided effect upon the relationship of the force applied to the piston assembly and the resultant speed of the piston assembly within the cylinder.

As can be appreciated with reference to FIGS. 9 and 11, the sleeve member 130 has been designed so that it can be readily manufactured from a piece of flat rectangular stock 142 in which the openings 134 are formed of a predetermined configuration. The sheet of planar stock 142 can be easily rolled into the cylindrical form of FIG. 9 so as to fit snuggly into the internal chamber of the piston body. Of course, the sleeve member could be molded of a resilient plastic material or the like and achieve the desired results.

Briefly describing the operation of the apparatus, the high pressure compartment 42 of the cylinder 22 would be filled with a hydraulic fluid and the low pressure chamber 44 would be partially filled with the same fluid. Axial movement of the piston body 86 toward the rear end 48 of the inner cylindrical tube, or to the left as viewed in FIG. 5, would compress the fluid in the rear end of the high pressure chamber thereby causing the fluid to flow through the fixed orifices 112 in the circular plate 94 and into the internal chamber 110 of the piston body where it would exert a forward axial pressure against the ring member 120 causing the ring member to move forwardly against the yielding resistance of the compression spring 126. The forward movement of the ring member advances the divider 140 across the aligned opening 134 in the sleeve member 130 so that fluid is allowed to flow through the rearward groove 136 in the ring member, across the divider, through the opening 134 in the sleeve member, and subsequently through the forward groove 138 in the ring member before passing through the orifices 116 in the forward end 90 of the piston body and into the cylinder forwardly of the piston body. In this manner, the flow of fluid from a location rearwardly of the piston body to forwardly of the piston body is controlled by the configuration of the opening 134 in the sleeve member and the position of the ring member 120 relative to the aligned opening 134 in the sleeve member. The sliding movement of the ring member is, of course, controlled by the pressure exerted thereon and the pre-determined pressure setting or strength of the compression springs 124 and 126. It should be noted that since the fluid must flow through fixed orifices 112 to reach the internal chamber 110, similar to conventional shock absorbing apparatus where the fluid flows through fixed passages in the piston, the control of the piston movement established by the configuration of the bypass opening and the strength of the compression springs actually supplements the control of the piston movement established with conventional apparatus.

When the piston body is moved forwardly or to the right as viewed in FIG. 5, an opposite flow of fluid is established through the piston member and to prevent a possible vacuum buildup in the high pressure compartment 42 of the cylinder to the left of the piston member when the piston is moving forwardly, fluid is allowed to flow through the orifice 82 at the rear end of the inner cylindrical tube 40 against the bias of the split ring 84 to maintain the desired pressure distribution. It has been found, however, in most installations that the split ring 84 is not required whereby the fluid would be free to flow equally between the high pressure and low pressure compartments of the cylinder member depending upon the direction of movement of the piston body.

As will be more readily understood with a more detailed description of the operation hereinafter, it is not necessary that a perfect fluid seal be established between the outer surface of the piston body 86 and the inner surface of the inner cylindrical tube 40 since any fluid which may pass along this interface would not change the fluid flow control established by the ring member 120 except that if a high degree of leakage were to occur along the interface, the fluid flow control established by the ring member could be delayed or in other words, operative at a higher pressure level. Since the seal along the interface between the piston body and the inner cylindrical tube is not critical, the piston body has been designed so that the forward portion 144 of the outer surface of the piston body tapers forwardly and inwardly and the rearward portion 146 of the outer surface of the piston body tapers rearwardly and inwardly. This design provides for easier sliding movement and reduces tolerance requirements.

Figure 14:
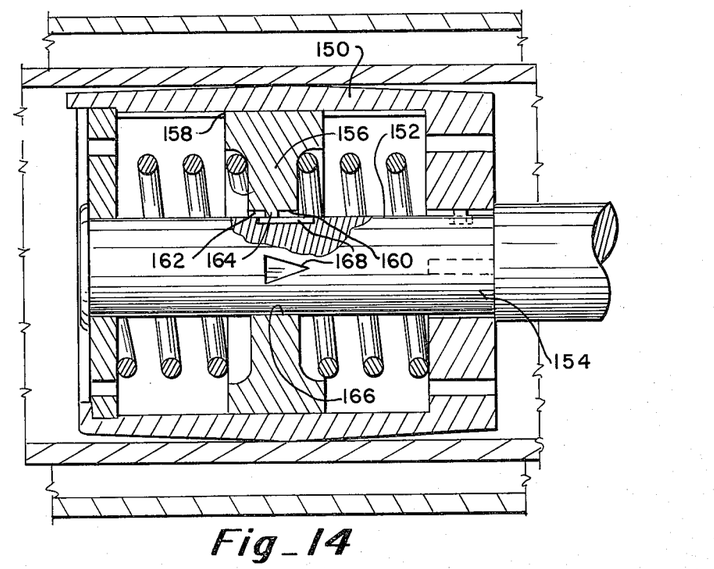
FIG. 14 is a fragmentary vertical section similar to FIG. 5 through a shock absorbing apparatus utilizing a second embodiment of the fluid-flow control system of the present invention.

A second embodiment of the present invention is shown in FIG. 14. In this embodiment, a piston body 150 is again rotatably mounted in a recessed portion 152 of a piston rod 154 for movement between fixed angularly related positions. A ring member 156 in this embodiment is keyed to the piston body 150 at 158 for unitary rotation therewith and axial sliding movement relative thereto but instead of having axially spaced grooves in its outer peripheral surface, the ring member 156 is provided with forward and rearward axially aligned grooves 160 and 162 respectively spaced by a divider 164 in its inner peripheral surface 166. Circumferentially spaced recesses 168 are machined in the recessed portion 152 of the piston rod 154 in the desired configurations and are adapted to be radially aligned with the ring member 156 whereby fluid can flow from one side of the ring member to the opposite side by passing through one of the grooves in the ring member, around the divider 164, through the aligned recess 168 in the piston rod, and through the other groove in the ring member. The operation of this embodiment would, of course, be substantially the same as that of the first described embodiment.

Figure 15A:
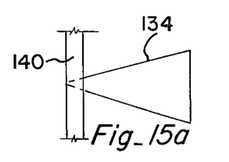
Figure 15B:
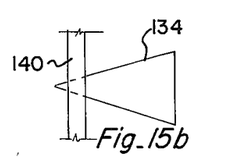
Figure 15C:
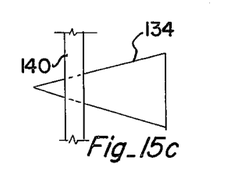
Figure 15D:
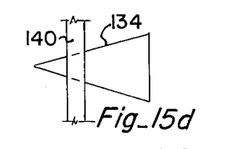
Figure 15E:
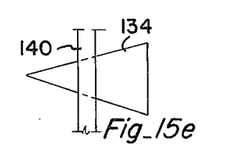
Figures 15G, 15H, 15I, 16:
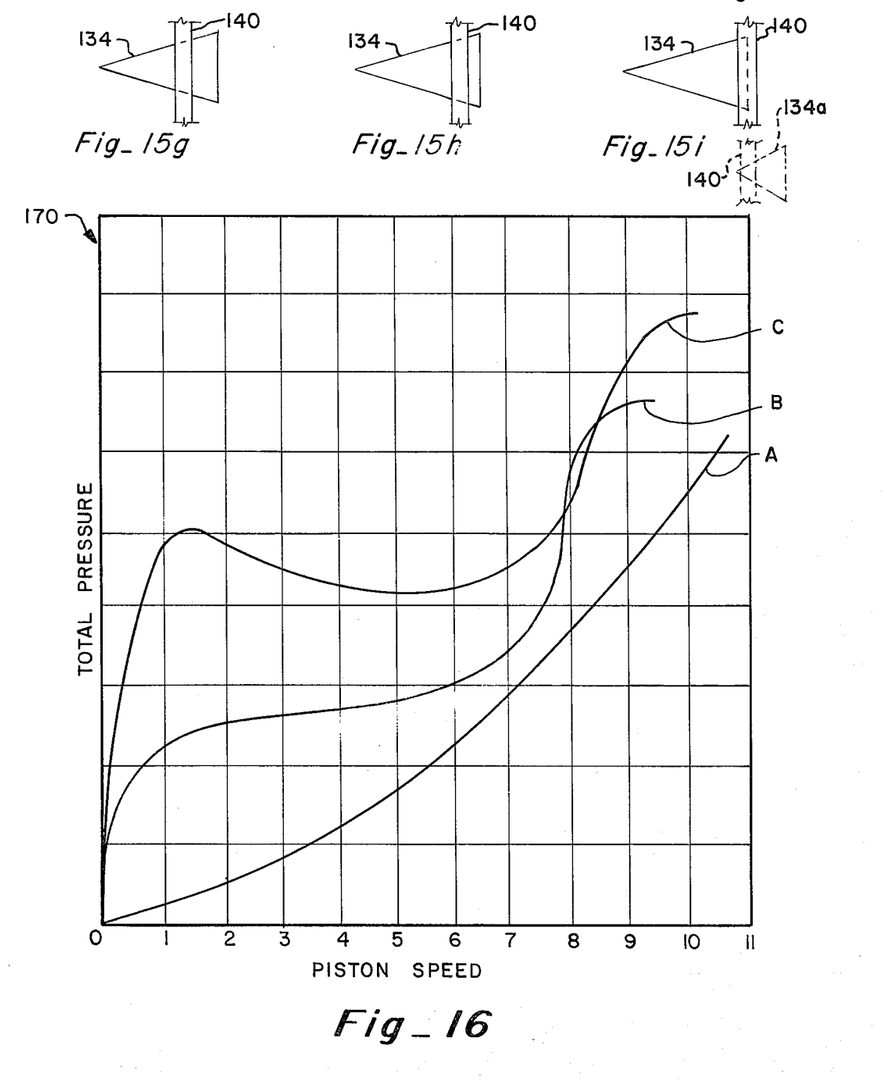

To better define the advantages attained with the fluid flow control system of the present invention, reference is made to FIG. 16 wherein a graphical representation 170 plotting the total pressure applied to a piston assembly against the resultant piston speed is shown. Curve A in FIG. 16 represents a typical curve of a conventional shock absorbing apparatus. It can be seen in Curve A that the pressure can only be increased with increased piston speed. In other words, the resistance to the piston movement within the cylinder will only increase with increased piston speed. Curves B and C are representative of curves which can be obtained utilizing the system of the present invention. Curve B is obtainable with one particular bypass opening configuration and Curve C is obtainable with another bypass opening configuration. It is readily apparent from the Curves B and C that utilizing the fluid flow control system of the present invention, it is not necessary to increase the piston speed to increase the pressure resistance to piston movement. This is true since the pressure setting or strength of the coil springs, which yieldingly resist movement of the slide member, can be such that an immediate pressure buildup is created before fluid is allowed to flow past the ring member, as illustrated with both Curves B and C. Depending upon the configuration of the bypass opening, at some predetermined pressure, the total pressure can actually decrease with increased piston speed, e.g. if at the predetermined pressure, the bypass opening becomes large enough to suddenly allow a large flow of fluid past the ring member. Continued movement of the ring member across the bypass opening can subsequently reduce the effective size of the bypass so that the pressure again increases with piston speed as illustrated in both Curves B and C and this or other relationships may be continued as desired depending upon the configuration of the bypass opening. This phenomena can probably best be illustrated by reference to FIGS. 15a through 15i wherein the divider 140 of FIG. 5 is shown in a sequence of phantom line positions as it traverses a triangular shaped bypass opening 134. In the first position, FIG. 15a, wherein the divider 140 initially becomes aligned with the pointed end of the triangular opening, no fluid is allowed to flow, but at the divider moves to the position of FIG. 15b, a small amount of fluid will be allowed to flow past the ring member since the rate of flow of fluid is dependent upon the narrowest width of the opening in communication with the grooves 136 and 138 on opposite sides of the divider. As the divider is advanced further to the position of FIG. 15c, increased amounts of fluid are allowed to pass by the divider since the size of the opening on both sides of the divider is greater than in the position of FIG. 15b. With the triangular configuration, it will be appreciated that as the divider advances toward the base of the triangle in FIGS. 15d through 15f, an increasing volume of fluid will be allowed to flow past the ring member, but when the divider approaches the base of the triangle as in FIGS. 15g and 15h, the rate of flow will begin to decrease since the minimum opening size which now is on the right side of the divider begins to get smaller. When the divider passes the base end of the triangle, FIG. 15i, so that no fluid is able to pass, there will be a sudden increase in pressure. To prevent this sudden increase in pressure from damaging the apparatus, a second triangular configuration 134a may be positioned adjacent the first triangular opening to cooperate with the first triangular configuration so that the divider traverses the second opening after passing the first opening thereby allowing fluid to flow through the second configuration 134 when it can no longer flow through the first configuration 134. Such a combination is illustrated in FIG. 15i. It will be appreciated that if a diamond shaped opening were utilized such as designated by the letter c in FIG. 11, a different effect would be accomplished since once the divider passed the maximum width of the opening, the effective passage opening would be rapidly reduced as the divider approached the opposite pointed end of the diamond. It will be readily apparent that the curves obtained utilizing a triangular and a diamond shaped opening would be different so that depending upon the relationship between total pressure and piston speed desired, the user of the device could select any one of a multitude of opening configurations to obtain the desired result. As a consequence, with the apparatus of the present invention, the pressure resistance within the apparatus is not dependent upon the piston speed as in conventional shock absorbing apparatus but rather the speed of movement of the piston is a result of the pre-established pressure resistance determined by the pressure setting or strength of the compression springs 124 and 126 and the configuration of the bypass opening. It should also be appreciated that in the preferred embodiments described herein, the apparatus is designed so that a number of bypass opening configurations are incorporated into a single unit and can be selected according to the relationship of total pressure to piston speed desired.

Although the present invention has been described with a certain degree of particularity, it is understood that the present disclosure has been made by way of example and that changes in details of structure may be made without departing from the spirit thereof.

What is claimed is:

1. A fluid flow control apparatus having a hollow cylinder provided with end walls at opposite ends thereof, a quantity of fluid in the cylinder, and a piston assembly having a piston member slidable axially within the cylinder, said piston member having an internal chamber in fluid communication with the fluid within said cylinder at opposite ends of said piston member, slide valve means disposed in said internal chamber movable axially with respect to said piston member, fluid by-pass passage means located within said internal chamber having a plurality of spaced openings each defining a selectively variable cross-sectional opening size and configuration for establishing fluid communication between opposite sides of said slide valve means when traversed by said slide valve means, resilient means associated with said slide valve means yieldingly resisting axial movement of said slide valve means in opposite axial directions, said slide valve means movable through said internal chamber in response to fluid pressure to traverse said fluid by-pass passage means for selectively controlling the rate of flow of fluid past said slide valve means within said internal chamber, the cross-sectional opening size and configuration of each of the openings of said fluid by-pass passage means being varied in accordance with preselected pressure resistance levels in the direction of movement of said slide valve means thereacross, said fluid by-pass passage means thereby cooperating with said resilient means in establishing changes in resistance pressure of the fluid on opposite sides of said slide valve means notwithstanding changes in the speed of movement of said piston through said cylinder when said slide valve means moves axially with respect to said piston member to traverse said by-pass passage means.

2. The fluid-flow control apparatus of claim 1 wherein said resilient means includes spring members disposed on opposite sides of said piston member to yieldingly resist axial movement of the slide member in opposite axial directions.

3. The fluid-flow control apparatus of claim 2 wherein said bypass passage means is disposed in an internal wall of the piston member.

4. The fluid-flow control apparatus of claim 3 wherein said openings are of non-circular cross-sectional configuration.

5. The fluid-flow control apparatus of claim 4 wherein said slide member has an outer surface which conforms to the configuration of the internal surface surrounding said internal chamber of the piston member so as to slidingly engage said internal surface and wherein the outer engaging surface of the slide member has at least one axially spaced notch which is movable into radial alignment with a selected one of said openings in the internal surface of the piston member whereby fluid can flow past an aligned notch and opening to allow fluid to pass through the piston member.

6. The fluid-flow control apparatus of claim 5 wherein said slide member is selectively rotatable relative to said piston member between fixed positions in which at least one of said axially spaced notches in the slide member can be radially aligned with selected openings in the internal surface of the piston member.

7. The fluid-flow control apparatus of claim 2 wherein said piston member includes a piston rod and a piston body, said piston rod extending through one end wall of the cylinder and axially through said piston body, and wherein said slide member is slidable along said piston rod, and wherein said fluid by-pass passage means comprises openings in the outer surface of said piston rod such that said slide member is movable across said openings to control the flow of fluid around said slide member and through said openings.

8. The fluid-flow control apparatus of claim 7 wherein each said opening is of non-circular cross-section configuration.

9. The fluid-flow control apparatus of claim 8 wherein said slide member has an inner surface which conforms to the configuration of the outer surface of the piston rod so as to slidingly engage said outer surface and wherein said inner surface of the slide member has axially spaced notches which are movable into radial alignment with an opening in the outer surface of the piston rod whereby fluid can flow between the axially spaced notch and the opening to allow fluid to pass through the piston member.

10. The fluid-flow control apparatus of claim 9 wherein said slide member is selectively rotatable relative to said piston rod between fixed positions in which said axially spaced notches in the inner surface of the slide member can be radially aligned with a selected one of the openings in the piston rod.

11. The fluid-flow control apparatus of claim 1 wherein said cylinder has an inner pressure chamber in which said piston member is at least partially disposed for axial movement, an outer pressure chamber, and a flow passage adjacent an end of the cylinder communicating with both the inner and outer pressure chambers of the cylinder whereby fluid can flow between the inner and outer pressure chambers.

12. The fluid-flow control apparatus of claim 11 wherein said piston member includes a piston rod extending through one end of said cylinder and wherein said flow passage is adjacent the end of the cylinder opposite to said one end.

13. The fluid-flow control apparatus of claim 12 further including valve means operatively cooperating with said flow passage to selectively permit the flow of fluid from the outer pressure chamber to the inner pressure chamber and to limit the flow of fluid from the inner pressure chamber to the outer pressure chamber.

14. The fluid-flow control apparatus of claim 13 wherein said valve means is comprised of a split ring of limited resiliency having a diameter approximately the same as the diameter of the inner pressure chamber, said split ring being disposed in the inner pressure chamber in alignment with said flow passage to limit the egress of fluid from the inner pressure chamber, the resiliency of the split ring being such as to flex inwardly when a selected pressure is applied thereto from the outer pressure chamber to allow the flow of fluid from the outer pressure chamber to the inner pressure chamber of the cylinder.

15. A shock absorbing apparatus comprising in combination:

a cylinder having an outer cylindrical wall and an inner cylindrical wall defining inner and outer concentric pressure chambers, a flow passage at one end of the inner cylindrical wall establishing fluid communication between the pressure chambers at said one end, end caps at opposite ends of the cylinder establishing fluid tight seals at each end of the inner and outer cylindrical walls and a quantity of fluid within said inner and outer pressure cylinders and, a piston assembly having a piston rod extending through one end cap of the cylinder and a piston member rotatably mounted on said piston rod and adapted for axial sliding movement within the inner pressure chamber, said piston member having a cylindrical body with a cylindrical inner compartment and end walls having openings therein providing fluid communication between said cylindrical inner compartment and the inner pressure chamber of said cylinder, a ring member slidably mounted on the piston rod within said inner compartment of the piston body in slidable engagement with an inner surface of the piston body, said ring member having axially spaced notches in an outer surface thereof opening toward said inner surface of the piston body, means for preventing rotation of said ring member relative to said piston rod, spring means on opposite sides of said ring member yieldingly resisting axial sliding movement of the ring member along the piston rod, said piston body having a plurality of circumferentially spaced fluid by-pass passage means in said inner surface of the piston body opening inwardly into said inner compartment, each of said fluid by-pass passage means being of a different selected size and configuration to establish a different predetermined resistance pressure in the fluid notwithstanding changes in speed of movement of said piston through said cylinder when said notches in the ring member are advanced across at least one of said fluid by-pass passage means in the piston body establishing a fluid by-pass from one side of the ring member to the other, and releasable lock means interconnecting said piston body and the piston rod to selectively prevent relative rotation between said piston body and piston rod whereby axial movement of said piston body through said inner pressure chamber will result in fluid pressure being applied against said ring member to slide said ring member along the piston rod until the notches in the ring member become aligned with at least one of said fluid by-pass means in the inner surface of the piston body thereby allowing the fluid to pass from one side of the ring member to the other.

16. In a hydraulic dampening apparatus having a hollow cylinder with end walls at opposite ends thereof, a quantity of hydraulic fluid in the cylinder, and a piston assembly with a generally cylindrical piston member slidable axially in said cylinder so that hydraulic fluid is allowed to flow through the piston member upon sliding movement of the piston member, the improvement comprising:

a chamber within said piston member, end walls at opposite ends of said piston member having openings therethrough in fluid communication with said chamber to allow the passage of hydraulic fluid, and a plurality of circumferentially spaced fluid by-pass passage means in an internal surface of said piston member, each including a recess opening in said surface and each having a different predetermined cross-sectional opening size and configuration to regulate the pressure resistance in the fluid notwithstanding changes in speed of movement of said piston through said cylinder, a slide member totally disposed within said chamber movable axially with respect to said piston member and said slide member being adapted to traverse a selected recess opening in selectively controlling the flow of hydraulic fluid past said slide member and through said recess opening whereby the rate of flow of hydraulic fluid past said slide member and through said recess opening and the resistance pressure of hydraulic fluid at opposite ends of the piston member is at least partially determined by the position of said slide member relative to the selected recess opening.

17. In the hydraulic dampening apparatus of claim 16, further including resilient means in said chamber yieldingly resisting axial movement of the slide member.

18. In the hydraulic dampening apparatus of claim 17, wherein said resilient means are disposed on opposite sides of said piston member so as to yieldingly resist axial movement of the slide member in opposite axial directions.

19. In the hydraulic dampening apparatus of claim 18, wherein each said opening is of non-circular cross-sectional configuration.

20. In the hydraulic dampening apparatus of claim 19 wherein said slide member has an outer surface which conforms with the configuration of said internal surface of the piston member and wherein said internal surface surrounds said chamber so that an outer surface of said slide member slidingly engages said internal surface and wherein said outer surface of the slide member has axially spaced notches which are movable into radial alignment with at least one of said recess openings in the internal surface of the piston member whereby fluid can flow through the axially spaced notches and said recess opening to allow fluid to pass through the piston member.

21. In the hydraulic dampening apparatus of claim 20, wherein said slide member is selectively rotatable relative to said piston member between fixed positions in which said axially spaced notches in the slide member can be radially aligned with a selected one of the openings in the internal surface of the piston member.

* * * * *